(12) United States Patent
Chen et al.

(10) Patent No.: US 11,327,241 B2
(45) Date of Patent: May 10, 2022

(54) OPTICAL FIBER ADAPTER STRUCTURE

(71) Applicants: Wuhan Telecommunication Devices Co., Ltd, Wuhan (CN); Accelink Technologies Co., Ltd., Wuhan (CN)

(72) Inventors: Xuguang Chen, Wuhan (CN); Qiangpeng Hu, Wuhan (CN); Jun Zhang, Wuhan (CN); Zhiqiang Chen, Wuhan (CN); Hong Zhu, Wuhan (CN); Po Liang, Wuhan (CN)

(73) Assignees: Wuhan Telecommunication Devices Co., Ltd; Accelink Technologies Co., Ltd.

( * ) Notice: Subject to any disclaimer, the term of this patent is extended or adjusted under 35 U.S.C. 154(b) by 0 days.

(21) Appl. No.: 16/767,927

(22) PCT Filed: Dec. 26, 2017

(86) PCT No.: PCT/CN2017/118532
§ 371 (c)(1),
(2) Date: May 28, 2020

(87) PCT Pub. No.: WO2019/061902
PCT Pub. Date: Apr. 4, 2019

(65) Prior Publication Data
US 2021/0116647 A1 Apr. 22, 2021

(30) Foreign Application Priority Data
Sep. 30, 2017 (CN) .......................... 201710922935.9

(51) Int. Cl.
*G02B 6/38* (2006.01)
(52) U.S. Cl.
CPC ......... *G02B 6/3825* (2013.01); *G02B 6/3846* (2013.01); *G02B 6/3861* (2013.01)

(58) Field of Classification Search
USPC .......................................................... 385/78
See application file for complete search history.

(56) References Cited

U.S. PATENT DOCUMENTS

| | | | | |
|---|---|---|---|---|
| 4,840,451 A | * | 6/1989 | Sampson | ............. G02B 6/4277 385/88 |
| 5,118,925 A | * | 6/1992 | Mims | .................... H01J 29/867 174/382 |

(Continued)

FOREIGN PATENT DOCUMENTS

| | | |
|---|---|---|
| CN | 1255977 A | 6/2000 |
| CN | 102237598 A | 11/2011 |

(Continued)

OTHER PUBLICATIONS

Chinese Search Report for Application No. 201710922935.9, dated Dec. 10, 2018, pp. 1-3.

(Continued)

*Primary Examiner* — Kaveh C Kianni
(74) *Attorney, Agent, or Firm* — Lerner, David, Littenberg, Krumholz & Mentlik, LLP

(57) ABSTRACT

An optical fiber adapter structure, comprises a metal flange, a tubular housing, an insulating ring, an optical fiber stub, and a shielding annulus. The optical fiber stub is embedded into the metal flange; the shielding annulus is fixed at a bottom of the metal flange by means of a conductive adhesive; the shielding annulus covers an end of the optical fiber stub and is provided with a reserved hole only for laser signals to pass through; the tubular housing is sleeved to the bottom of the metal flange; and the tubular housing is insulated from the metal flange by means of the insulating ring. The conductive adhesive adheres the shielding annulus made of conductive material to a tail end of the metal flange and maintains complete electrical contact therebetween, (Continued)

such that the electromagnetic wave radiation between the interior of optical device and the exterior of metal flange is reduced.

8 Claims, 3 Drawing Sheets

(56) References Cited

U.S. PATENT DOCUMENTS

| | | | |
|---|---|---|---|
| 6,085,006 | A | 7/2000 | Gaio et al. |
| 6,349,164 | B1* | 2/2002 | Mair .................... G02B 6/3825 |
| | | | 385/134 |
| 7,172,348 | B2 | 2/2007 | Yabe et al. |
| 7,211,739 | B1* | 5/2007 | Brigham, Jr. ........ H05K 9/0058 |
| | | | 174/359 |
| 7,322,752 | B2 | 1/2008 | Endou et al. |
| 9,153,898 | B2* | 10/2015 | Dendas .............. H01R 13/6593 |
| 2003/0026552 | A1* | 2/2003 | Goode ................ G02B 6/4292 |
| | | | 385/88 |
| 2003/0169978 | A1* | 9/2003 | Sato .................... G02B 6/4246 |
| | | | 385/88 |
| 2007/0179554 | A1* | 8/2007 | Iyer ...................... A61N 1/3754 |
| | | | 607/37 |
| 2011/0243508 | A1 | 10/2011 | Koreeda et al. |
| 2015/0110444 | A1* | 4/2015 | Tanaka ................ G02B 6/3817 |
| | | | 385/75 |
| 2015/0125119 | A1 | 5/2015 | Droesbeke |
| 2017/0254973 | A1* | 9/2017 | Yu ........................ G02B 6/4244 |

FOREIGN PATENT DOCUMENTS

| | | |
|---|---|---|
| CN | 202393942 U | 8/2012 |
| CN | 104412140 A | 3/2015 |
| CN | 107155288 A | 9/2017 |
| CN | 107608033 A | 1/2018 |
| CN | 107608033 B | 5/2019 |
| EP | 1251376 A2 | 10/2002 |
| JP | 2006064990 A | 3/2006 |

OTHER PUBLICATIONS

International Search Report for Application No. PCT/CN2017/118532, dated Jul. 18, 2018, pp. 1-2.

* cited by examiner

OPTICAL FIBER ADAPTER STRUCTURE

CROSS REFERENCE TO RELATED APPLICATIONS

The present application is a national phase entry under 35 U.S.C. § 371 of International Application No. PCT/CN2017/118532, filed Dec. 26, 2017, which claims priority from Chinese Patent Application No. 201710922935.9 filed Sep. 30, 2017, all of which are hereby incorporated herein by reference.

TECHNICAL FIELD

The present disclosure relates to an optical communication field, particularly to an optical fiber adapter structure.

BACKGROUND

Optical fiber communication systems are constantly developing in the direction of high speed and high port density. As one of the core components of optical fiber communication, optical devices are also facing technical challenges. For example, the frequency of optoelectronic signals to be processed by the optical devices continues increasing, and the packaging requirements of the optical devices are more and more compact.

At present, the frequency of signals processed by high-speed optical devices is up to 25 GHz, and the electromagnetic compatibility problem caused by high-frequency signals is very serious. In order to improve the impact of electromagnetic compatibility problems, the optical fiber communication systems, the high-speed optical modules, and the optical devices usually use metal materials to produce their shells, while minimizing gaps among shell parts, the purposes of which are to reduce the effects of leakage of the internal high-frequency signals radiated to the outside and interference of the external high-frequency noises on the internal signals by means of such as strengthening electromagnetic shielding on each part of the internal boards, the circuits, the optical devices, and etc. In generally, a body of the optical device is charged or very sensitive to static electricity and cannot be electrically connected to the metal shell and metal flange 1.

In order to make the packaging of the optical devices more compact, many optical devices use an optical fiber adapter to connect the optical fiber plug outside the optical communication system and the internal optical path of the optical device. The widely used optical fiber adapter structures are LC pluggable type, SC pluggable type, etc. The internal structures of the two types of adapters are similar, while their difference is mainly in the inner diameters of the adapters with the diameter of the optical fiber stub 4 of the LC pluggable type being 1.25 mm and the diameter of the optical fiber stub 4 of the SC pluggable type being 2.5 mm. The front end of the fiber optical adapter needs to be exposed to the harsh electromagnetic environment in order to connect the external fiber plug, thus the design of the optical fiber adapter has an important impact on the electromagnetic shielding performance of the optical device.

An existing optical fiber adapter structure with better electromagnetic compatibility performance, as shown in FIG. 1, includes a metal flange 1, a welding ring 2, an insulating adhesive 3, an optical fiber stub 4, and a sleeve 5. The optical fiber stub 4 is used to connect and align an external optical fiber plug with an inner optical path of the optical device. The sleeve 5 is sleeved between the front end of the optical fiber stub 4 and the metal flange 1 to assist the alignment of the front end of the optical fiber stub 4 and the optical path of the external optical fiber plug. The metal flange 1 is coaxially sleeved outside the optical fiber stub 4 and the sleeve 5 for fixing the optical fiber adapter and guiding the external optical fiber plug. The conductive metal flange 1 is in contact with the metal shell to improve the electromagnetic shielding performance of the optical device. The welding ring 2 made of metal is coaxially surrounded around the rear end of the optical fiber stub 4 for fixing the optical fiber adapter and the body of the optical device together. There is a gap between the welding ring 2 and the metal flange 1 to keep the welding ring 2 electrically insulating from the metal flange 1. The insulating adhesive 3 is cured in this gap for connecting the metal flange 1, the welding ring 2, and the optical fiber stub 4, in order to enhance the insulation performance and connection strength between the metal flange 1 and the welding ring 2.

The existing optical fiber adapter with better electromagnetic compatibility performance has following disadvantages, although has a simple structure.

The through-hole in which the optical fiber stub 4 is inserted leaks high-frequency electromagnetic waves, resulting in the electromagnetic shielding performance not being good enough, and the optical fiber stub 4 is too long, resulting in the optical device package not being compact enough.

SUMMARY

The technical problem to be solved by the present disclosure is that the electromagnetic shielding performance of the existing optical fiber adapter is not good enough, and the optical fiber stub 4 of the existing optical fiber adapter is longer, resulting in the optical device package not being compact enough.

The optical fiber stub 4 of the existing optical fiber adapter is made of ceramics or similar materials without electromagnetic shielding function. Since the LC or SC pluggable type of optical fiber stub 4 has 1.25 or 2.5 mm in diameter, such a large through-hole results in the electromagnetic wave leakage between the interior of the optical device and the exterior of the metal flange 1, thereby affecting the electromagnetic shielding performance. The mutually insulated metal flange 1 and the welding ring in the existing optical fiber adapter are coaxially assembled on the optical fiber stub 4, and a certain insulation gap is reserved therebetween. In order to ensure the mechanical strength, the metal flange 1 and the welding ring 2 both need to keep a sufficient press-fit length with the optical fiber stub 4, resulting in a larger overall axial length of the existing optical fiber adapter and a less compact optical device package.

The present disclosure adopts the following technical solutions.

In a first aspect, the present disclosure provides an optical fiber adapter structure comprising a metal flange 101, a tubular housing 102, an insulating ring 103, and an optical fiber stub 104, wherein the optical fiber adapter structure further comprises a shielding annulus 108, wherein the optical fiber stub 104 is embedded in the metal flange 101, and the shielding annulus 108 is fixed at a bottom of the metal flange 101 by a conductive adhesive 107, wherein the shielding annulus 108 covers a tail end of the optical fiber stub 104 and is provided with a reserved aperture only for laser signals to pass through; and wherein the tubular housing 102 is sleeved to a bottom of the metal flange 101 and insulated from the metal flange 101 by the insulating ring 103.

Preferably, the metal flange 101, the tubular housing 102, and the insulating ring 103 all three are radially assembled, wherein the nested insulating ring 103 is used to electrically insulate the metal flange 101 from the tubular housing 102, and an insulating adhesive 106 is used to adhere and fix the metal flange 101, the tubular housing 102, and the insulating ring 103 nested therebetween together.

Preferably, the shielding annulus 108 is made of a conductive material, and an axial projection of the shielding annulus 108 at the tail end of the optical fiber stub 104 is annular.

Preferably, a central light-pass-through aperture of the shielding annulus 108 is tapered, and is drilled in a direction from the tail end to a front end of the optical fiber stub 104.

Preferably, a smallest diameter of the tapered aperture ranges from 0.15 mm to 0.5 mm.

Preferably, the optical fiber stub 104 and the metal flange 101 are assembled together by means of press-fit, and a length of the press-fit ranges from 1 mm to 5 mm.

In a second aspect, the present disclosure provides an optical fiber adapter structure comprising a metal flange 101, a tubular housing 102, an insulating ring 103, an optical fiber stub 104, and a sleeve 105, wherein the optical fiber adapter structure further comprises an insulating adhesive 106, a conductive adhesive 107, and a shielding annulus 108, wherein a first-level inner ring of the metal flange 101 is provided with the sleeve 105, and a second-level inner ring of the metal flange 101 is embedded with the optical fiber stub 104, wherein an inner diameter of the second-level inner ring is smaller than that of the first-level inner ring; and an outer wall of the metal flange 101 at the second-level inner ring is provided with a second-level outer ring, an inner diameter of which is smaller than that of a first-level outer ring of the metal flange 101, wherein the first-level outer ring is an outer wall of a main body of the metal flange 101; an end surface, provided with the second-level inner ring, of the metal flange 101 is provided with the shielding annulus 108 which is fixed by the conductive adhesive 107, wherein the shielding annulus 108 covers a tail end of the optical fiber stub 104 and is provided with a reserved aperture only for laser signals to pass through; and wherein an inner wall of the tubular housing 102 is provided with a first-level inner ring and a second-level inner ring, wherein the insulating ring 103 is nested between the second-level outer ring of the metal flange 101 and the first-level inner ring of the tubular housing 102, and the insulating adhesive 106 is filled between the first-level inner ring of the tubular housing 102 and the first-level outer ring of the metal flange 101, and between the second-level inner ring of the tubular housing 102 and the second-level outer ring of the metal flange 101.

Preferably, the metal flange 101, the tubular housing 102 and the insulating ring 103 all three are radially assembled, wherein the nested insulating ring 103 is used to electrically insulate the metal flange 101 from the tubular housing 102, and an insulating adhesive 106 is used to adhere and fix the metal flange 101, the tubular housing 102, and the insulating ring 103 nested therebetween together.

Preferably, the shielding annulus 108 is made of a conductive material, and an axial projection of the shielding annulus 108 at the tail end of the optical fiber stub 104 is annular.

Preferably, the conductive adhesive 107 adhesives and fixes the shielding annulus 108 to a tail end of the metal flange 101 and maintains complete electrical contact between the metal flange 101 and the shielding annulus 108.

Preferably, a central light-pass-through aperture of the shielding annulus 108 is tapered, and is drilled in a direction from the tail end to a front end of the optical fiber stub 104.

Preferably, a smallest diameter of the tapered aperture ranges from 0.15 mm to 0.5 mm.

Preferably, a length of press-fit between the optical fiber stub 104 and the metal flange 101 ranges from 1 mm to 5 mm.

Preferably, when the insulating ring 103 respectively bears against a step between the first-level outer ring and the second-level outer ring of the metal flange 101, and a step between the first-level inner ring and the second-level inner ring of the tubular housing 102:

a distance of an end surface of the first-level inner ring of the tubular housing 102 beyond the step of the metal flange 101 is a first predetermined distance; and a distance of an end surface of the second-level outer ring of the metal flange 101 beyond the step of the tubular housing 102 is a second predetermined distance.

Preferably, the first predetermined distance ranges from 0.5 mm to 2 mm, and the second predetermined distance ranges from 0.3 mm to 2 mm.

Compared with the prior art technology, the beneficial effects of the present disclosure are:

In the optical fiber adapter structure provided by the present disclosure, the metal flange 101, the insulating ring 103 and the tubular housing 102 all three are radially assembled from interior to exterior, saving the length of press-fit of the optical fiber stub 104. Thus, compared with the existing optical fiber adapter in which the metal flange 1 and the welding ring 2 are coaxially assembled on the optical fiber stub 1 and the sufficient length of press-fit and the insulation gap are retained, the length of the optical fiber stub 104 in the present disclosure may be shorten and a more compact optical device package may be achieved;

Furthermore, in the present disclosure, the conductive adhesive 107 is used to adhere the shielding annulus 108 to the tail end of the metal flange 101 and maintain complete electrical contact therebetween, resulting in the reduction of the electromagnetic wave radiation between the interior of the optical device and the exterior of the metal flange 101, and the tapered aperture having a smaller diameter than that of the optical fiber stub 104 is provided in the center of the shielding annulus 108 and connects the optical path, such that it simultaneously achieves effects of not only ensuring pass-through of the optical path but also reducing the electromagnetic wave leakage.

BRIEF DESCRIPTION OF THE DRAWINGS

In order to more clearly explain the embodiments of the present disclosure or the technical solutions in the prior art, the drawings required in the embodiments of the present disclosure or the description of the prior art are briefly introduced in the followings. Obviously, the drawings described below are merely some embodiments of the present disclosure. Skilled persons in the art may obtain other drawings based on these drawings, without paying any creative labor.

DETAILED DESCRIPTION

In order to make the objectives, technical solutions and advantages of the present disclosure clearer, the following further describes the present disclosure in detail in combination with the drawings and embodiments. It should be understood that the specific embodiments described herein are merely used to explain the present disclosure, not to limit the present disclosure.

In the description of the present disclosure, the orientation or positional relationships indicated by the terms "inner", "outer", "longitudinal", "lateral", "upper", "lower", "top", "bottom", etc. are the orientation or positional relationships indicated based on the drawings, which are only for the convenience of describing the present disclosure and do not require that the present disclosure must be constructed and operated in specific orientations, therefore, it should not be understood as a limit on the present disclosure.

In addition, the technical features involved in the various embodiments of the present disclosure described below may be combined with each other if there is no conflict among each other.

Embodiment 1

Figure 1:
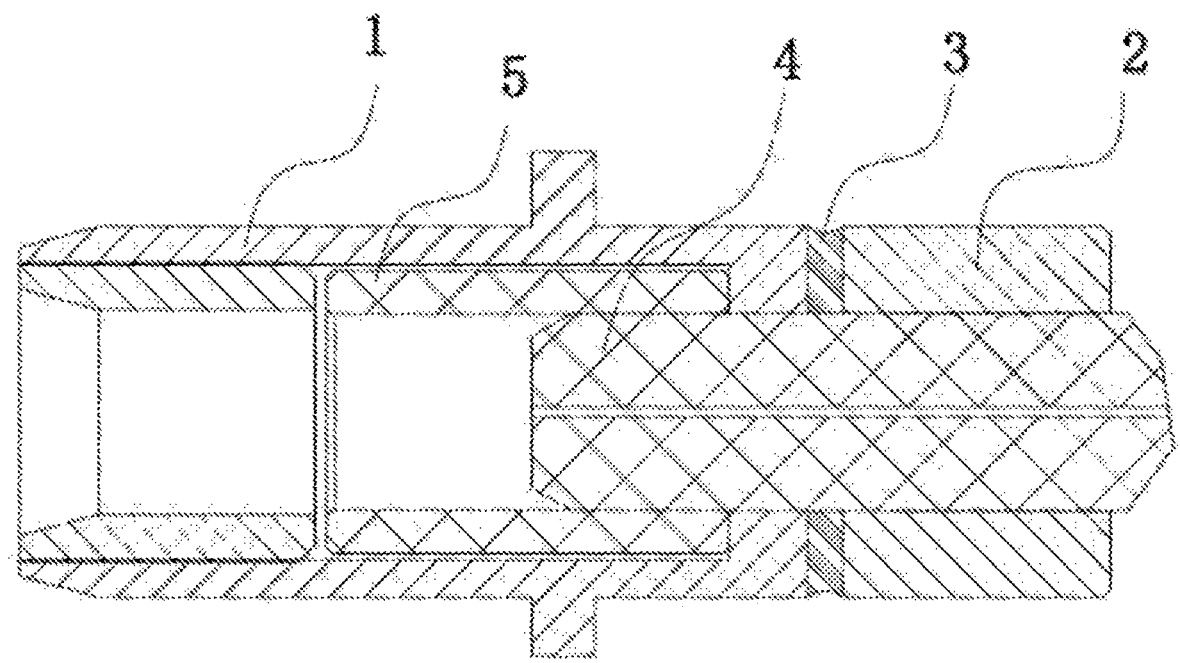
FIG. 1 is a schematic diagram of an optical fiber adapter structure in the prior art.
Figure 2:
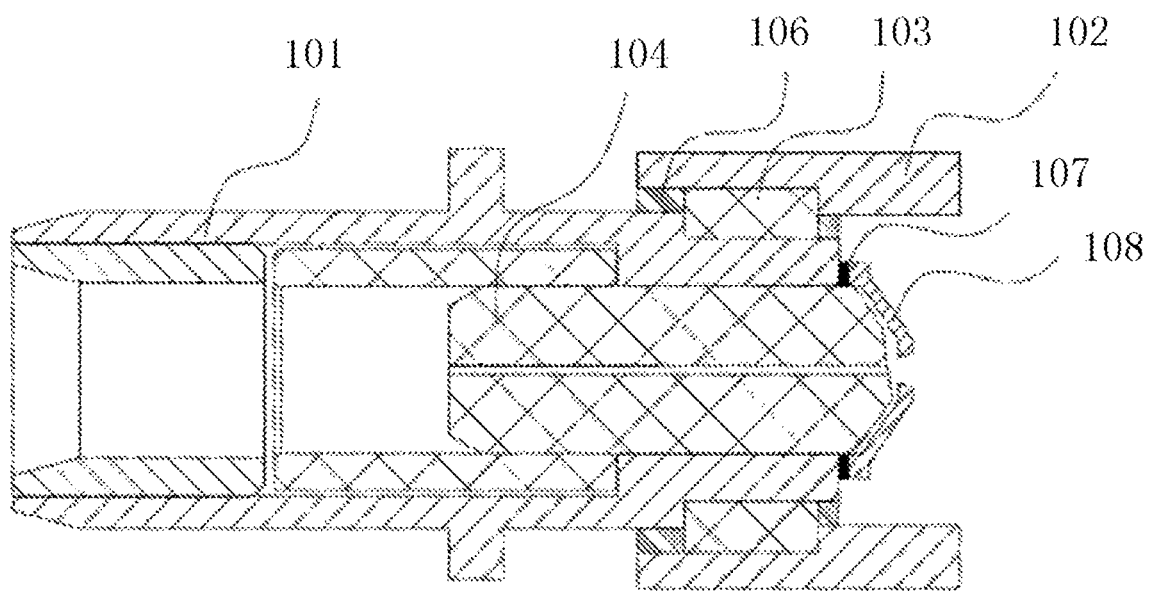
FIG. 2 is a schematic diagram of an optical fiber adapter structure provided by an embodiment of the present disclosure.

The embodiment 1 of the present disclosure provides an optical fiber adapter structure, which comprises a metal flange 101, a tubular housing 102, an insulating ring 103, and an optical fiber stub 104, as shown in FIG. 2. The optical fiber adapter structure further comprises a shielding annulus 108.

The optical fiber stub 104 is embedded in the metal flange 101. The shielding annulus 108 is fixed at a bottom of the metal flange 101 by a conductive adhesive 107. The shielding annulus 108 covers a tail end of the optical fiber stub 104 and is provided with a reserved aperture only for laser signals to pass through.

The tubular housing 102 is sleeved to a bottom of the metal flange 101 and insulated from the metal flange 101 by the insulating ring 103.

In the optical fiber adapter structure provided by the embodiment of the present disclosure, the metal flange 101, the insulating ring 103, and the tubular housing 102 all three are radially assembled from interior to exterior, saving a length of press-fit of the optical fiber stub 104. Compared with the existing optical fiber adapter in which a metal flange 1 and a welding ring 2 are coaxially assembled on an optical fiber stub 1 and a sufficient length of press-fit and a insulation gap are retained, the present disclosure can shorten the length of the optical fiber stub 104 and achieve a more compact package of the optical device.

Furthermore, in the present disclosure, a conductive adhesive 107 is used to adhere the shielding annulus 108 to a tail end of the metal flange 101 and to maintain complete electrical contact therebetween, reducing the electromagnetic wave radiation between the interior of the optical device and the exterior of the metal flange 101, and a tapered aperture having a diameter smaller than the diameter of the optical fiber stub 104 is provided in the center of the shielding annulus 108 and connects the optical path, such that it simultaneously achieves effects of not only ensuring transparent transmission of the optical path but also reducing the electromagnetic wave leakage.

In the embodiment of the present disclosure, there is a preferred implementation for assembling of the metal flange 101, the tubular housing 102 and the insulating ring 103 all three, which is simple and efficient. That is, by means of radially assembling the metal flange 101, the tubular housing 102, and the insulating ring 103, the nested insulating ring 103 is used to electrically insulate the metal flange 101 from the tubular housing 102, and an insulating adhesive 106 is used to adhere and fix the metal flange 101, the tubular housing 102, and the insulating ring 103 nested therebetween together.

In combination with the embodiments, the implementation of the shielding annulus 108 is further limited and optimized. Specifically, the shielding annulus 108 is made of a conductive material, and an axial projection of the shielding annulus 108 at the tail end of the optical fiber stub 104 is annular.

The shielding annulus 108 is used to reduce the unshielded aperture in the metal flange 101 formed by the optical fiber stub 104, and to reduce the electromagnetic wave radiation between the interior of the optical device and the exterior of the metal flange 101. An aperture having a smaller diameter than that of the optical fiber stub 104 and provided in the center of the shielding annulus 108 connects the optical path.

In this embodiment, at the tail end of the optical fiber stub 104, the metal flange 101, the conductive adhesive 107, and the shielding annulus 108 constitute a relatively complete electromagnetic shielding equipotential body. The smaller the unshielded aperture is, the smaller the leakage of electromagnetic waves is. Therefore, the electromagnetic shielding performance of this embodiment is better than that of the existing fiber adapter structure.

In the embodiment of the present disclosure, the conductive adhesive 107 adheres and fixes the shielding annulus 108 to the tail end of the metal flange 101, and maintains complete electrical contact between the metal flange 101 and the shielding annulus 108.

Figure 5:
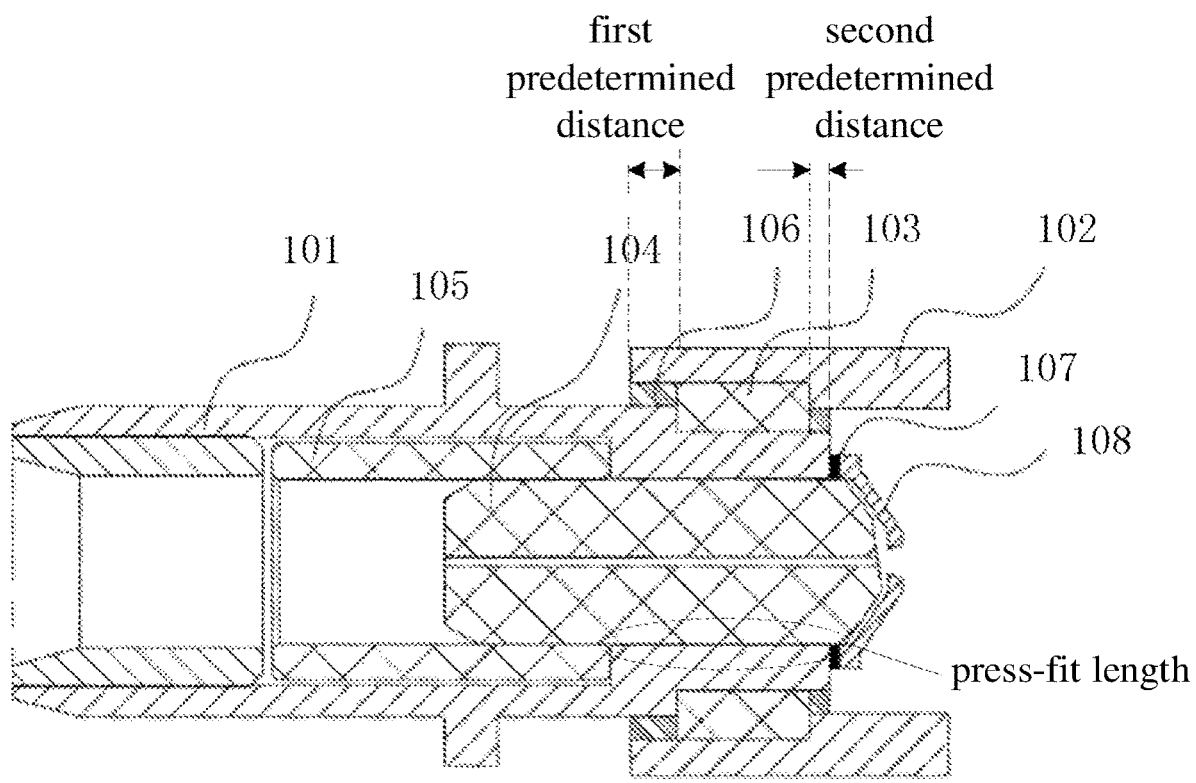
FIG. 5 is a schematic diagram of an optical fiber adapter structure provided by an embodiment of the present disclosure.

As shown in FIG. 5, a central light-pass-through aperture of the shielding annulus 108 is tapered, and is drilled in a direction from the tail end to a front end of the optical fiber stub 104. A smallest diameter of the tapered central light-pass-through aperture ranges from 0.15 mm to 0.5 mm.

In various embodiments of the present disclosure, the press-fit length between the optical fiber stub 104 and the metal flange 101 may range from 1 mm to 5 mm.

Embodiment 2

Figure 3:
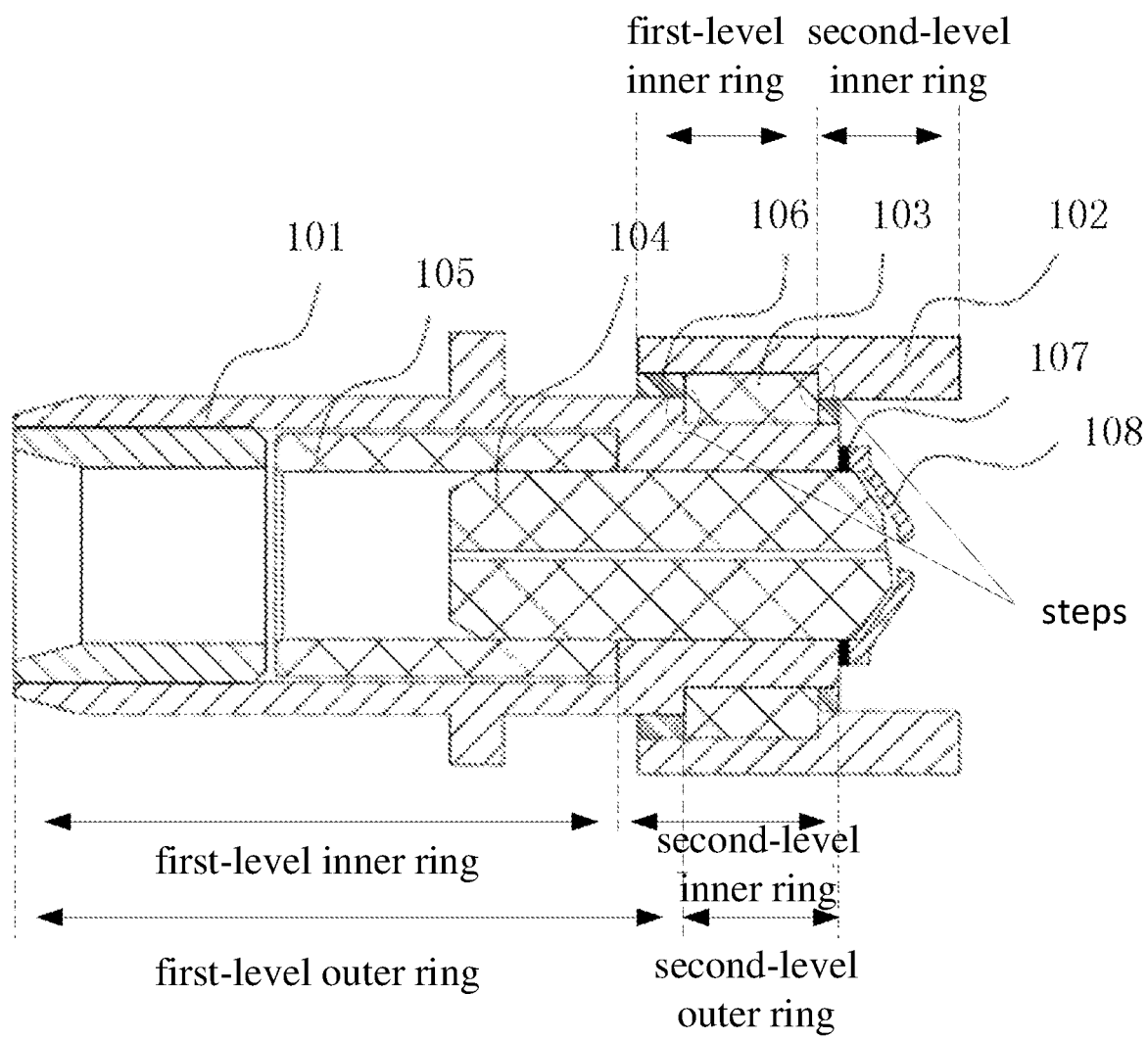
FIG. 3 is a schematic diagram of an optical fiber adapter structure provided by an embodiment of the present disclosure.

The embodiment 2 of the present disclosure provides an optical fiber adapter structure, as shown in FIG. 3, which comprises a metal flange 101, a tubular housing 102, an insulating ring 103, an optical fiber stub 104, and a sleeve 105. The optical fiber adapter structure further comprises an insulating adhesive 106, a conductive adhesive 107, and a shielding annulus 108.

A first-level inner ring of the metal flange 101 is provided with the sleeve 105, and a second-level inner ring of the metal flange 101 is embedded with the optical fiber stub 104, wherein an inner diameter of the second-level inner ring is smaller than that of the first-level inner ring. An outer wall of the metal flange 101 at the second-level inner ring is provided with a second-level outer ring. The diameter of a second-level outer ring is smaller than that of a first-level outer ring of the metal flange 101, wherein the first-level outer ring is an outer wall of a main body of the metal flange 101. An end surface, provided with the second-level inner ring, of the metal flange 101 is provided with a shielding annulus 108 which is fixed by the conductive adhesive 107. The shielding annulus 108 covers a tail end of the optical fiber stub 104, and is provided with a reserved aperture only for laser signals to pass through.

An inner wall of the tubular housing 102 is provided with a first-level inner ring and a second-level inner ring. The insulating ring 103 is nested between the second-level outer ring of the metal flange 101 and the first-level inner ring of the tubular housing 102. The insulating adhesive 106 is filled between the first-level inner ring of the tubular housing 102 and the first-level outer ring of the metal flange 101, and between the second-level inner ring of the tubular housing 102 and the second-level outer ring of the metal flange 101.

In the embodiment of the present disclosure, the sleeve 105 is installed between the interior of the metal flange 101 and a front end of the optical fiber stub 104, and is used to assist the optical alignment of the optical fiber stub 104 with the external optical fiber plug, achieving the optical alignment of the tail end of the optical fiber stub 104 with the inner optical path of the optical device.

Figure 4:
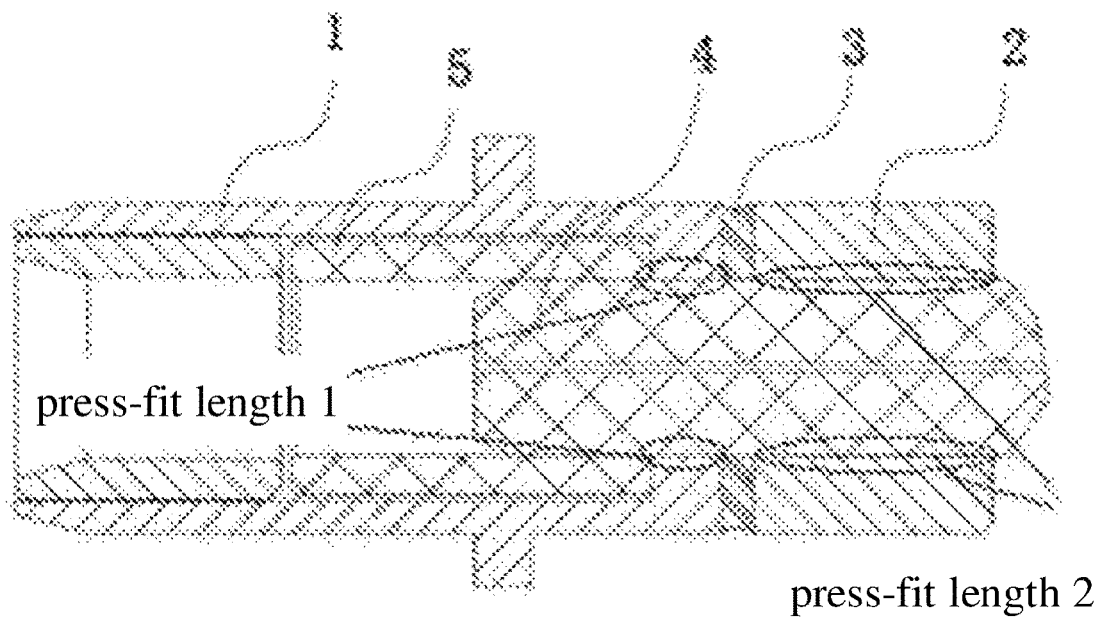
FIG. 4 is a schematic diagram of a press-fit length in an optical fiber adapter structure in the prior art.

In the optical fiber adapter structure provided by the embodiment of the present disclosure, the metal flange 101, the insulating ring 103 and the tubular housing 102 are radially assembled from interior to exterior, saving the length of press-fit of the optical fiber stub 104. Compared with the existing optical fiber adapter in which the metal flange 1 and the welding ring 2 (equivalents to the tubular housing 102 of the embodiment of the present disclosure) are coaxially assembled on the optical fiber stub 1 and a sufficient length of press-fit and a insulation gap are retained (as shown in FIG. 4, the effective press-fit length in the prior art is obtained by summing the "press-fit length 1" and "press-fit length 2" as described in FIG. 4), in the embodiment of the present disclosure, the length of the optical fiber stub 104 may be shorten (the "press-fit length" as shown in FIG. 5), thus the optical device package is implemented to be more compact. Furthermore, in the embodiment of the present disclosure, the conductive adhesive 107 is used to adhere the shielding annulus 108 made of a conductive material to the tail end of the metal flange 101 and to maintain complete electrical contact therebetween, reducing the electromagnetic wave radiation between the interior of the optical device and the exterior of the metal flange 101, the tapered aperture having a smaller diameter than that of the optical fiber stub 104 is provided in the center of the shielding annulus 108 and passes the optical signal through, such that it simultaneously achieves effects of not only ensuring transparent transmission of the optical path but also reducing the electromagnetic wave leakage.

In the embodiment of the present disclosure, there is a preferred implementation for assembling of the metal flange 101, the tubular housing 102 and the insulating ring 103 together, which is simple and efficient. That is, by means of radially assembling the metal flange 101, the tubular housing 102, and the insulating ring 103, the nested insulating ring 103 is used to electrically insulate the metal flange 101 from the tubular housing 102, and the insulating adhesive 106 is used to adhere and fix the metal flange 101, the tubular housing 102, and the insulating ring 103 nested therebetween together.

In combination with the embodiments, the implementation of the shielding annulus 108 is further limited and optimized. Specifically, the shielding annulus 108 is made of a conductive material, and the axial projection of the shielding annulus 108 at the tail end of the optical fiber stub 104 is annular.

The shielding annulus 108 is used to reduce unshielded apertures in the metal flange 101 formed by the optical fiber stub 104, resulting in reducing the electromagnetic wave radiation between the interior of the optical device and the exterior of the metal flange 101. There is an aperture in the center of the shielding annulus 108 for passing the optical signal through, the diameter of which is smaller than that of the optical fiber stub 104.

In this embodiment, at the tail end of the optical fiber stub 104, the metal flange 101, the conductive adhesive 107, and the shielding annulus 108 constitute a relatively complete equipotential body of electromagnetic shielding. The smaller the unshielded aperture is, the smaller the leakage of electromagnetic waves is. Therefore, the electromagnetic shielding performance of this embodiment is better than that of the existing fiber adapter structure.

In the embodiment of the present disclosure, the conductive adhesive 107 adhesively fixes the shielding annulus 108 to the tail end of the metal flange 101 and maintains complete electrical contact between the metal flange 101 and the shielding annulus 108.

As shown in FIG. 5, a central light-pass-through aperture of the shielding annulus 108 is tapered, and is drilled in a direction from the tail end to the front end of the optical fiber stub 104. The smallest aperture diameter of the tapered central light-pass-through aperture ranges from 0.15 mm to 0.5 mm.

In various embodiments of the present disclosure, the press-fit length between the optical fiber stub 104 and the metal flange 101 may range from 1 mm to 5 mm.

As shown in FIG. 5, when the insulating ring 103 respectively bears against a step between the first-level outer ring and the second-level outer ring of the metal flange 101, and a step between the first-level inner ring and the second-level inner ring of the tubular housing 102, a distance of an end surface of the first-level inner ring of the tubular housing 102 beyond the step of the metal flange 101 is a first predetermined distance, and a distance of an end surface of the second-level outer ring of the metal flange 101 beyond the step of the tubular housing 102 is a second predetermined distance. The first predetermined distance ranges from 0.5 mm to 2 mm, and the second predetermined distance ranges from 0.3 mm to 2 mm.

The above are merely preferred embodiments of the present disclosure and are not intended to limit the present disclosure. Any modification, equivalent replacement and improvement made within the spirit and principles of the present disclosure should be in the protection range of the present disclosure.

The invention claimed is:

1. An optical fiber adapter structure comprising a metal flange, a tubular housing, an insulating ring, and an optical fiber stub, wherein the optical fiber adapter structure further comprises a shielding annulus, wherein the optical fiber stub is embedded in the metal flange, and the shielding annulus is fixed at a bottom of the metal flange by a conductive adhesive, wherein the shielding annulus covers a tail end of the optical fiber stub and is provided with a reserved aperture only for laser signals to pass through; and the tubular housing is sleeved to the bottom of the metal flange and insulated from the metal flange by the insulating ring, wherein the metal flange, the tubular housing and the insulating ring all three are radially assembled, wherein the nested insulating ring is used to electrically insulate the metal flange from the tubular housing, and an insulating adhesive is used to adhere and fix the metal flange, the tubular housing, and the insulating ring nested therebetween together.

2. The optical fiber adapter structure of claim 1, wherein the shielding annulus is made of a conductive material, and an axial projection of the shielding annulus at the tail end of the optical fiber stub is annular.

3. The optical fiber adapter structure of claim 2, wherein the central light-pass-through aperture of the shielding annulus is tapered, and is drilled in a direction being from the tail end to a front end of the optical fiber stub.

4. The optical fiber adapter structure of claim 3 wherein a smallest diameter of the tapered aperture ranges from 0.15 mm to 0.5 mm.

5. The optical fiber adapter structure of claim 1, wherein the optical fiber stub and the metal flange are fixed by means of press-fit, and a length of the press-fit ranges from 1 mm to 5 mm.

6. The optical fiber adapter structure of claim 1, wherein the optical fiber adapter structure further comprises a sleeve, an insulating adhesive, and a conductive adhesive, wherein a first-level inner ring of the metal flange is provided with the sleeve, and a second-level inner ring of the metal flange is embedded with the optical fiber stub, wherein an inner diameter of the second-level inner ring is smaller than that of the first-level inner ring; and an outer wall of the metal flange at the second-level inner ring is provided with a second-level outer ring, an inner diameter of which is smaller than that of a first-level outer ring of the metal flange which is an outer wall of a main body of the metal flange;

wherein an end surface, provided with the second-level inner ring, of the metal flange is provided with the shielding annulus which is fixed by the conductive adhesive; and wherein an inner wall of the tubular housing is provided with a first-level inner ring and a second-level inner ring, wherein the insulating ring is nested between the second-level outer ring of the metal flange and the first-level inner ring of the tubular housing, and the insulating adhesive is filled between the first-level inner ring of the tubular housing and the first-level outer ring of the metal flange, and between the second-level inner ring of the tubular housing and the second-level outer ring of the metal flange.

7. The optical fiber adapter structure of claim 6 wherein when the insulating ring respectively bears against a step between the first-level outer ring and the second-level outer ring of the metal flange, and a step between the first-level inner ring and the second-level inner ring of the tubular housing, a distance of an end surface of the first-level inner ring of the tubular housing beyond the step of the metal flange is a first predetermined distance; and a distance of an end surface of the second-level outer ring of the metal flange beyond the step of the tubular housing is a second predetermined distance.

8. The optical fiber adapter structure of claim 7 wherein the first predetermined distance ranges from 0.5 mm to 2 mm, and the second predetermined distance ranges from 0.3 mm to 2 mm.

* * * * *